(12) United States Patent
Berlinger, Jr. et al.

(10) Patent No.: US 10,527,149 B2
(45) Date of Patent: Jan. 7, 2020

(54) CONJUGATE GEARS WITH CONTINUOUS TOOTH FLANK CONTACT

(71) Applicant: Gear Innovations LLC, Montgomeryville, PA (US)

(72) Inventors: Bernard E. Berlinger, Jr., Montgomeryville, PA (US); John Robert Colbourne, St. Albert (CA)

(73) Assignee: Gear Innovations LLC, Montgomeryville, PA (US)

(*) Notice: Subject to any disclaimer, the term of this patent is extended or adjusted under 35 U.S.C. 154(b) by 300 days.

(21) Appl. No.: 15/373,690

(22) Filed: Dec. 9, 2016

(65) Prior Publication Data

US 2017/0167589 A1 Jun. 15, 2017

Related U.S. Application Data

(60) Provisional application No. 62/266,489, filed on Dec. 11, 2015, provisional application No. 62/385,704, filed on Sep. 9, 2016.

(51) Int. Cl.
| | |
|---|---|
| *F16H 55/08* | (2006.01) |
| *F16H 55/10* | (2006.01) |
| *F16H 1/06* | (2006.01) |
| *F16H 1/08* | (2006.01) |
| *F16H 55/17* | (2006.01) |

(52) U.S. Cl.
CPC .......... *F16H 55/0806* (2013.01); *F16H 1/06* (2013.01); *F16H 1/08* (2013.01); *F16H 55/08* (2013.01); *F16H 55/17* (2013.01)

(58) Field of Classification Search
CPC .............................. F16H 55/0806; F16H 55/08
See application file for complete search history.

(56) References Cited

U.S. PATENT DOCUMENTS

| | | | |
|---|---|---|---|
| 3,855,874 A | 12/1974 | Honma et al. | |
| 5,271,289 A | 12/1993 | Baxter et al. | |
| 6,101,892 A | 8/2000 | Berlinger, Jr. et al. | |
| 6,178,840 B1 | 1/2001 | Colbourne et al. | |
| 6,964,210 B2 | 11/2005 | Colbourne | |
| 7,077,026 B2 | 7/2006 | Colbourne | |
| 8,061,229 B2 | 11/2011 | Zhuravlev | |
| 2005/0132836 A1* | 6/2005 | Colbourne | F16H 55/08 74/457 |
| 2011/0083523 A1 | 4/2011 | Huang et al. | |

FOREIGN PATENT DOCUMENTS

| | | |
|---|---|---|
| EP | 1832370 A1 | 9/2007 |
| TW | 201124653 A | 7/2011 |
| WO | WO 2009/110108 A1 | 9/2009 |

* cited by examiner

*Primary Examiner* — Jake Cook
(74) *Attorney, Agent, or Firm* — BakerHostetler (57) ABSTRACT

A gear system includes gears that each have a tooth flank profile that includes a convex addendum and a concave dedendum, and when in mesh satisfy the Euler Savory equation for conjugacy with contact over the entire tooth flank such that lines of contact are unbroken. The portion between the addendum and dedendum is an involute or other geometric curve.

20 Claims, 6 Drawing Sheets

CONJUGATE GEARS WITH CONTINUOUS TOOTH FLANK CONTACT

This claims the benefit of U.S. Provisional Patent Application Ser. No. 62/266,489 filed on Dec. 11, 2015 and U.S. Provisional Patent Application Ser. No. 62/385,704 filed on Sep. 9, 2016, the disclosure of each of which is hereby incorporated by reference as if set forth in its entirety herein.

TECHNICAL FIELD

The present invention relates to power transmission. In particular, the present invention relates to conjugate gear pairs.

BACKGROUND

Several attempts have been made to reduce the contact stress in gear teeth, since a high contact stress causes pitting and eventually failure of the teeth. Many of these attempts have been based on the Wildhaber or Novikov types of gearing, in addition to the more common involute forms. In Novikov gears, the profiles in the transverse sections are circular arcs, the pinion being convex and the gear being concave. The problem with circular arc profiles is that they are not conjugate. With conjugate profiles, the angular velocity ratio is exactly constant. In each transverse section there is continuous contact throughout the meshing cycle, and the contact point moves along each profile, towards the tip of the driving tooth and towards the root of the driven tooth.

Since a variable angular velocity ratio is not acceptable, Novikov gears are always made helical. This means that in each transverse section, only one pair of points ever comes into contact. At any instant, there will be one transverse section where contact occurs, and this contact point moves axially along the tooth face as the gears rotate. Such gears are generally noisy, and have not been widely used. Moreover, the same comments apply to Wildhaber gears, which are shaped as circular arcs in the normal sections.

U.S. Pat. No. 6,101,892 describes a major advancement in gear tooth profile design that greatly improves the load carrying capability of a parallel axis helical gear pair. Due to the fact that the stress optimized dedendum and addendum of this technology—both of these contact areas conformal in nature, (that is one of the surfaces is convex and the other is concave) versus convex/convex for the classical forms of involute pair—the area in and around the pitch point where the reversal of these curvatures takes place from concave (dedendum) to convex (addendum) presents several challenges.

Figure 1:
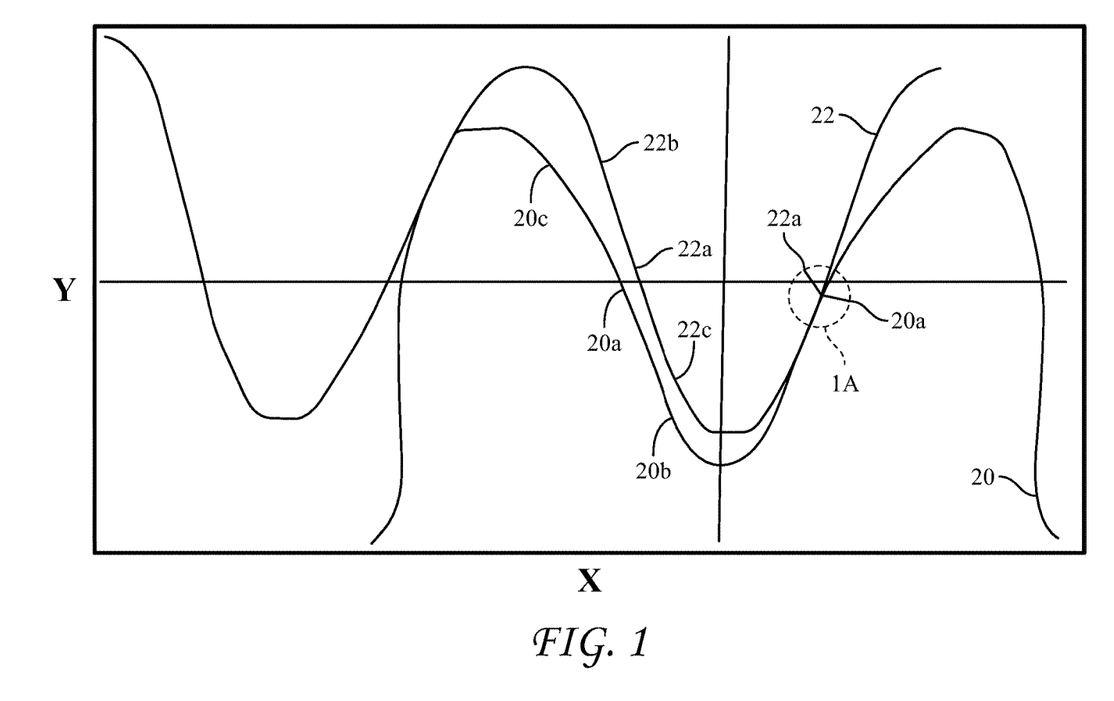
FIG. 1 (Prior Art) is a reproduction of FIG. 2 of the 892 patent, showing prior art tooth mesh.
Figure 1A:
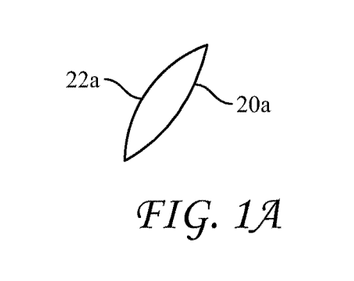
FIG. 1A (Prior Art) is FIG. 2A of the 892 patent, showing an enlarged portion of the pitch point of the teeth of FIG. 1, including a transition zone in which there is no tooth contact.
Figure 2:
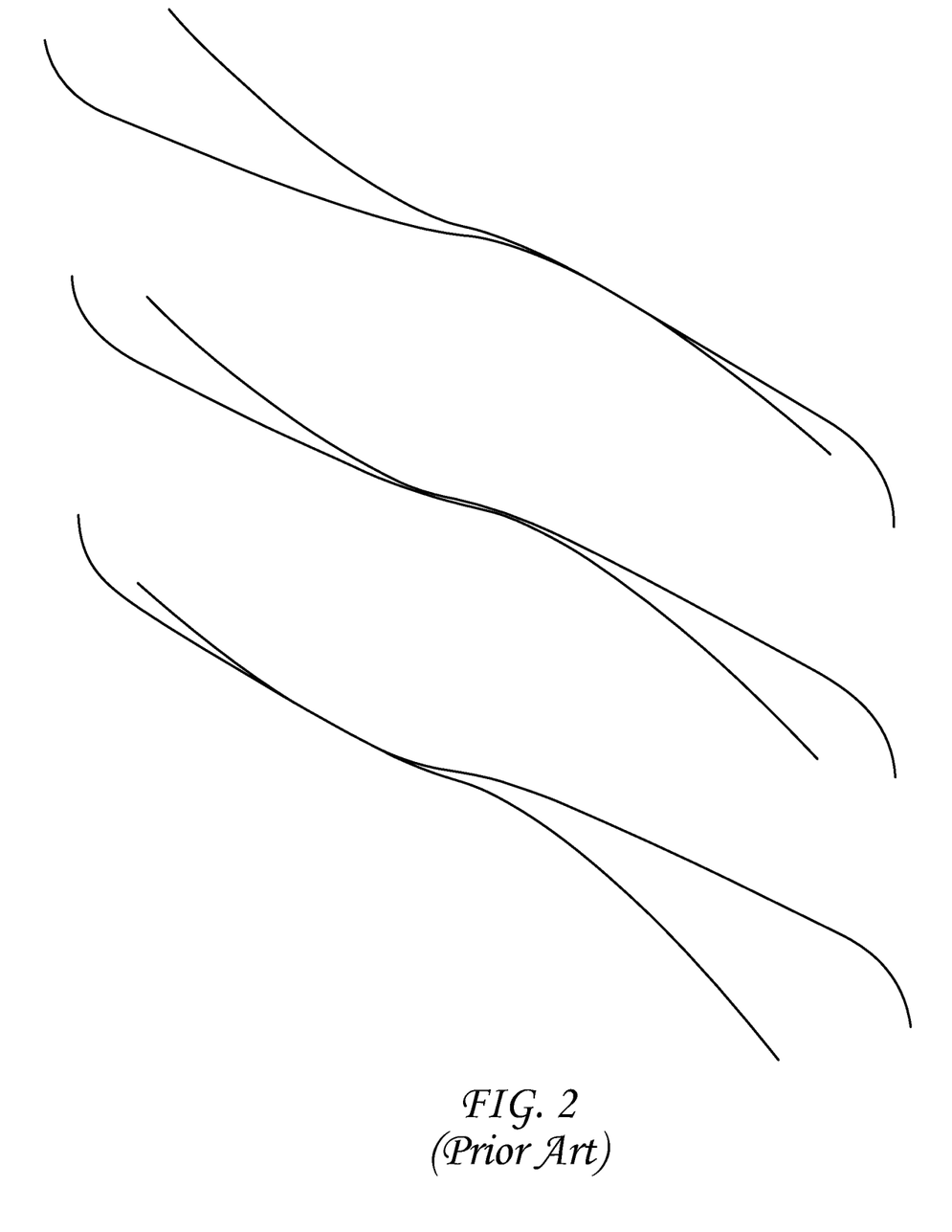

Accordingly the 892 patent teaches a transition zone between the concave dedendum to the convex addendum in which no tooth contact occurs. FIGS. 1 and 1A (Prior Art) illustrate the transverse section profiles of a 15-tooth pinion and a 90-tooth gear, and FIG. 1A shows a prior gear pair having no contact along the transition zones 20a and 22a. It is important to note that due to the scale of FIGS. 1 and 1A, and the slight and subtle nature of the transition zone it is impossible to discern simply by observing FIG. 1 the fact that no contact is made, at the flanks which are in contact, along the transition zone. This no contact condition is shown in FIG. 1A. Transition zones 20a and 20b of the right-most teeth of gears 20 and 22 are shown spaced apart (i.e. not in contact). The addendum 20c and 22c, and dedendum 20b and 22b portions of these profiles are designed according to the teachings of the 892 patent.

The transition of an active flank (that is, one that contacts the opposing gear tooth) into and out of the transition zone (that is, where there is no contact has been achieved in prior art configurations as smooth and continuous slopes. Abrupt changes in curvatures of these joining features can precipitate undesirable surface characteristics such as micropitting. U.S. Pat. No. 6,964,210, entitled "Gear Tooth Profile," and U.S. Pat. No. 7,077,026, entitled "Gear Tooth Profile Curvature," disclose a transition zone in which there is no contact.

SUMMARY

A crucial aspect of the 892 patent was a transition zone between the convex and concave portions of each tooth flank that had no contact with the mating gear, as illustrated in FIG. 1A, which is reproduced from the 892 patent. The 892 patent technology was developed in the belief that for practical reasons there must be no contact between the gears surfaces at the contact zone. For practical values of the transverse pressure angle, the relative curvature was deemed to be too high, and this would lead to high contact stresses.

Further, at the time of filing of the 892 patent, it was believed the runout of the gears might cause the end points of the transition zone of a gear to contact the mating gear at points different from the end points of its transition zone, which could result in unacceptable high stresses. Runout is present in all gears because of manufacturing tolerances in the gear shafts, bearings, and gears; because of shaft clearance in the bearings; and other factors. Runout can be up to several thousandths of an inch.

For these reasons, a segment of the pinion and gear tooth profiles lying on each side of the pitch diameter was replaced by a different curve (that is different from the contact surfaces above and below it), designed so that there would be no contact within these segments, which profile is illustrated in FIG. 1. These segments of the pinion and gear tooth profiles are named in the 892 patent the "transition zones." Various curves have been tried for the transition zones. These have always been chosen with continuity of profile and slope at the end points, known as the transition points. It was thought that changes of curvature could interrupt the continuity of the fluid film that separates the two gear tooth flanks in mesh, which will then cause stress peaks at the transition points. Additionally, care must be taken with respect to the manufacturing pressure angles of a design, since traditional gear manufacturing practice tries to avoid low (that is, low single digit) pressure angles. In the prior development, the transverse pressure angles around the pitch diameters were in the range of 3 degrees, before these segments were replaced by the transition zones. Based on test results, the transition zones were redesigned with pressure angles greater than 3 degrees.

In the convex/concave tooth configuration of the prior art 892 patent, there is a break in the lines of contact caused by the transition zone, so that the total length of the lines of contact change in length as they travel across the tooth faces of two helical gears in mesh. The conformal active tooth surfaces of the '892 configuration more than compensate for the drawbacks of this break with respect to much lower overall Hertz stress levels and on balance provide superior performance compared with a classic, same-sized involute pair.

The present invention theorizes that gear performance could be improved further and micro-pitting eliminated or its initiation much mitigated if, contrary to the earlier thinking, loads could be carried through the pitch point, so there would be no transition zone (as that term is used in the 892 patent), and the lines of contact would be unbroken and lengthened, thus reducing load intensity and in turn reducing the Hertz stresses. Preferably, the loads carried through the pitch point are to have the lowest feasible Hertz stresses in or near the transition zone, i.e., adjustments in relative curvatures and simultaneous conjugacy according to the Euler Savory equation, such that the line of contact would then be continuous and the load intensity of the mesh significantly reduced. Power density, load carrying capacity, the elimination of problems around the 892 transition zone, and unbroken lines of contact similar to those of classical involute gearing, but with reduced stresses, all contribute to major economic and performance improvements.

The disclosure herein uses the term "transition zone" to define a region, preferably on each side of the pitch point, of the tooth profile where the addendum transitions to the dedendum. The use of the term "transition zone," as is clear from this disclosure, includes a continuous line of contact through the transition zone as that term is used herein and as distinguished from the "transition zone" usage (that is, having no contact) in the 892 patent.

Accordingly, a gear system includes: a first gear including a tooth flank profile that includes a convex addendum and a concave dedendum; and a mating gear including a tooth flank profile that includes a convex addendum and a concave dedendum. The first gear and mating gear when in mesh satisfy the Euler Savory equation for conjugacy with contact over the entire tooth flank such that lines of contact are unbroken.

A transition zone between the addendum and dedendum of at least the first gear is adapted for contacting the transition zone of the mating gear. Preferably, in the transition zone where the pitch point of the contact path and the two points of the contact path immediately above and below the pitch line form a straight line.

Preferably, the gear pair pressure angle at the pitch point is between 3.0 and 30.0 degrees, and more preferably between 8.0 and 20.0 degrees. Calculated Hertz stress values of the first gear and mating gear are less than calculated Hertz stress values in an equivalent gearing system having involute tooth profiles and having the same gear ratio, number of teeth, face width, materials and heat treatment, and center distance. And calculated Hertz stress values of the first gear and mating gear are less than calculated Hertz stress values in an equivalent gearing system with tooth profiles configured according to the 892 patent and having the same gear ratio, number of teeth, face width, materials and heat treatment, and center distance.

The transition zone preferably defines a curve that is tangent to the addendum at the addendum transition point and tangent to the dedendum at the dedendum transition point, both extremities, at zero slope change. Preferably, the transition zone comprises an involute curve. The transition zone may also include at least one or a combination of cubic curves, spiral curves, quadratic curves, or other meshing geometric curves having the characteristics of satisfying the law gearing and the Euler-Savary equation. Further, the "curve" may be a straight line for one member with its mate conjugate to that straight line or both members maybe have straight lines transition zones.

Preferably, the transition zone has a height varying between 0.01 transverse modules and 0.80 transverse modules, preferably 0.01 to 0.3 transverse modules, and a pressure angle at the pitch diameter of from 1° to 30°, preferably from 8° to 23°. The present invention encompasses at least helical gears and spur gears.

BRIEF DESCRIPTION OF THE DRAWING

FIGS. 2 and 3 illustrate a gear pair having 18 and 33 teeth. The profiles in FIG. 2 are designed according to the 892 patent, and those in FIG. 3 are formed according to the methods described in this disclosure. The figures show the gear transverse section profiles in 3 positions as the gears pass through the meshing zone. FIG. 3 illustrates that there is no transition zone (as that term is used in the 892 patent), so that the contact is continuous about and through the pitch point.

DETAILED DESCRIPTION OF ILLUSTRATIVE EMBODIMENTS

Figure 4:
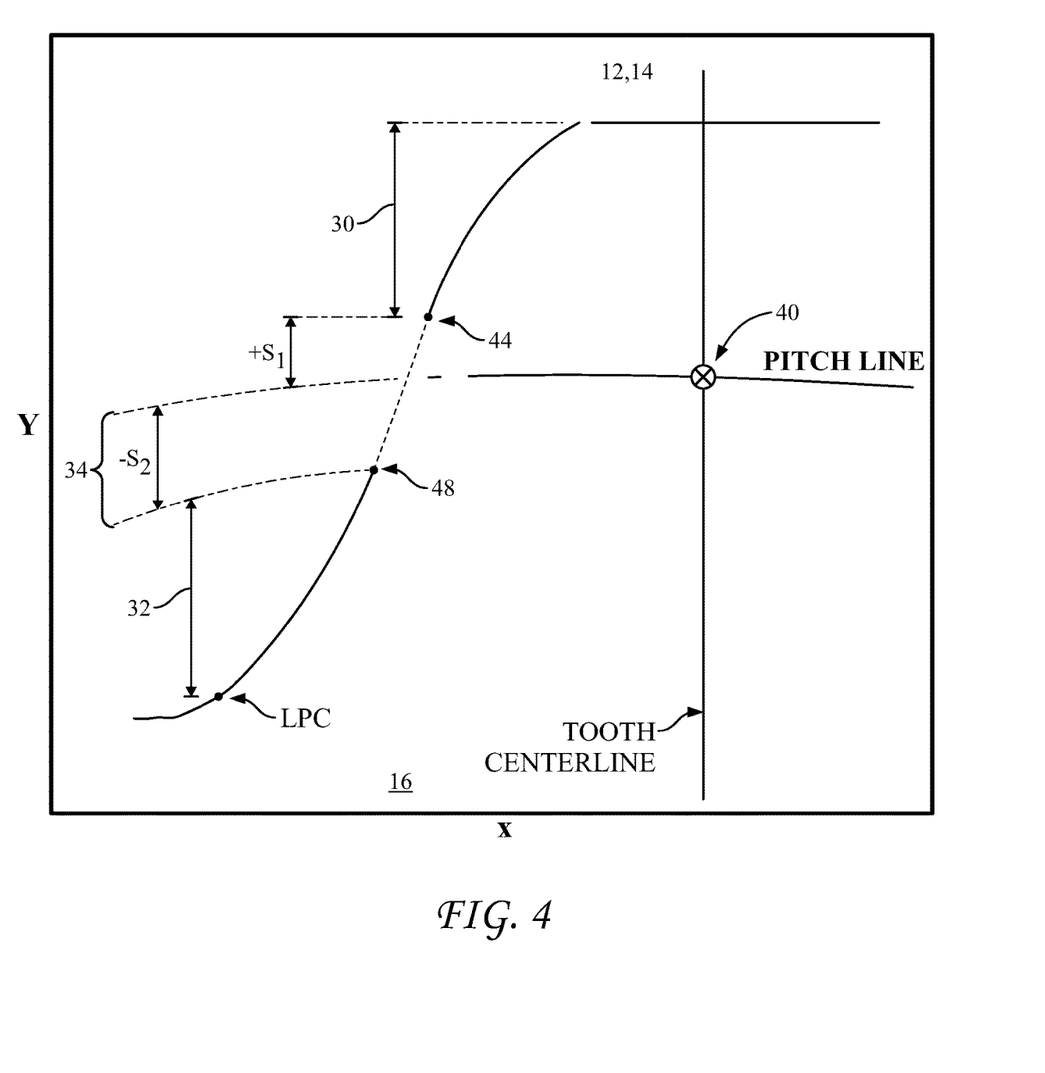
FIG. 4 is a cross sectional schematic gear tooth illustrating aspects of the transition zone.

A gear pair 10 includes a first gear 12 and a second gear 14. Each one of gears 12 and 14 includes a tooth flank profile 16 that includes a convex addendum 30, a concave dedendum 32, and a transition zone 34. In short, flank profile 16 includes what is commonly referred to in conventional gearing as the face and flank, as well as transition zone 34. As best shown in FIG. 4, each gear tooth form origin 40 formed by the pitch line (conventionally defined) and the radial centerline of the tooth. The upper boundary of the transition zone 40 is defined by addendum transition point 44, which is located at the lower end of addendum 30 where the addendum curve and transition curve, above the pitch line, meet, having coordinates, relative to origin 40 of $+S_1$, $-Y_1$. The lower boundary of the transition zone 40 is defined by dedendum transition point 48, which is located at the upper end of dedendum 32 where the dedendum curve and the transition curve, below the pitch line, meet, having coordinates, relative to origin 40 of $-S_2$, $-Y_2$.

For the purposes of this disclosure, the dedendum 32 is defined as the portion of the flank 16 that is between the dedendum transition point 48 and the lower point of tooth contact with the mating gear. The addendum 30 is defined as the portion of flank 16 that is between the addendum transition point 44 and the upper point of tooth contact with the mating gear, which is generally the outside diameter of the gear.

Figure 6:
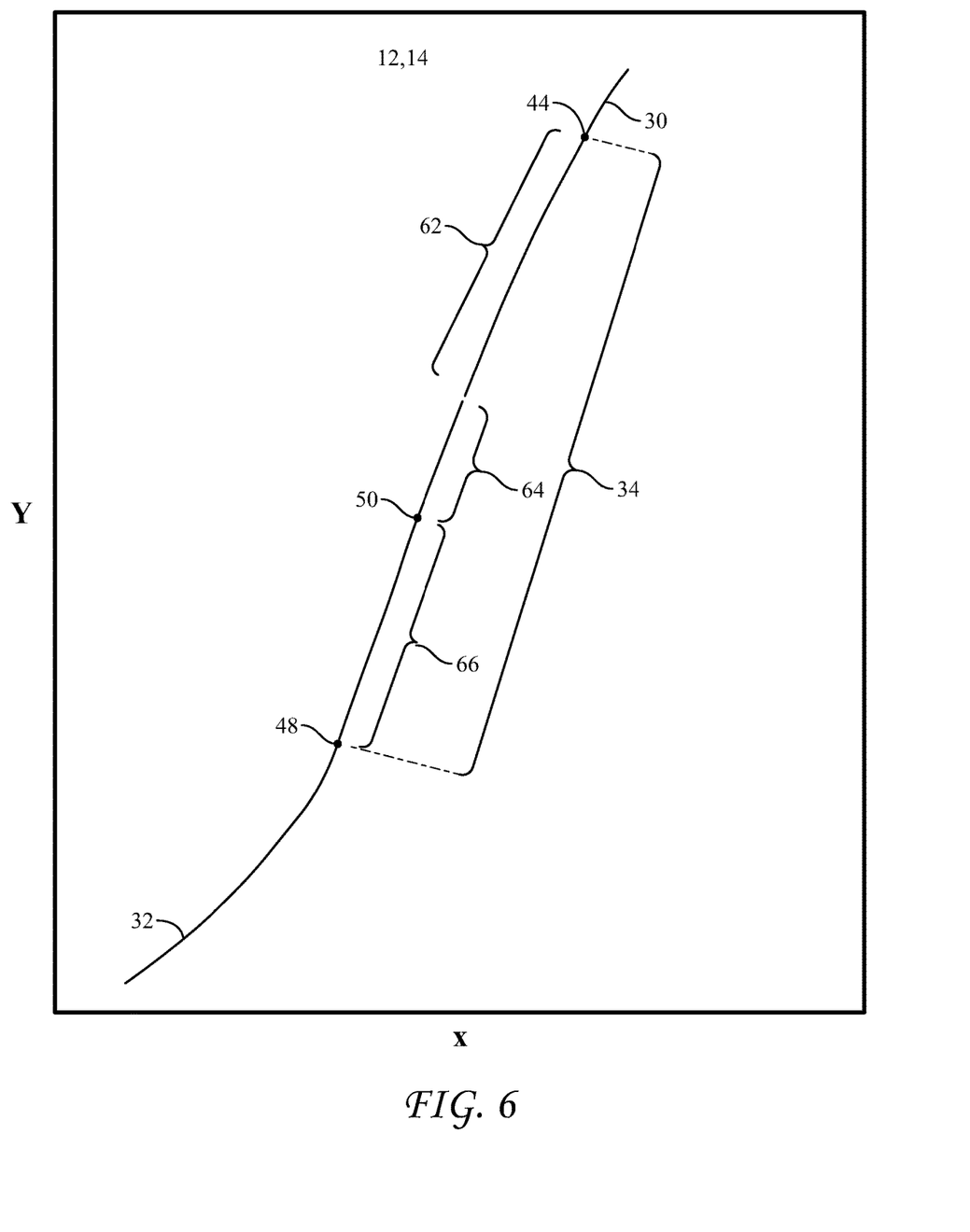
FIG. 6 is an enlarged portion of FIGS. 4 and 5 illustrating the transition zone.

As explained more fully herein, convex addendum and concave dedendum 30 and 32 are conformal as taught herein and consistent with the teachings of the 892 patent. As illustrated in FIG. 6, transition zone 34 between addendum transition point 44 and dedendum transition point 48 preferably includes an upper portion 62 that is a convex section that is conjugate to the mating portion of the dedendum of the corresponding gear, (preferably) a middle portion 64 that preferably is straight and preferably encompasses the pitch line, and a lower portion 66 that is concave. Upper portion 62 gradually decreases in curvature (from addendum transition point 44 until it merges with the upper end of middle portion 64. Lower portion 66 (from dedendum transition point 48) gradually decreases in curvature until it merges with the lower end of middle portion 64.

Preferably, the curves 30 and 62 at addendum transition point 44, 62 and 64, 64 and 66, and 66 and 32 at dedendum transition point 48 each merge at a point of tangency with zero slope change. That is, using curves 30 and 62 for illustration, the extremity of the addendum 30, which is preferably configured as taught in the 892 patent, at the addendum transition point 44 and the extremity of the transition zone curve 62 coming up to the addendum transition point 44, at the point at which they are infinitesimally spaced apart, have the same pressure angle. Each one of curves 62, 64, and 66 may be chosen from one or more of an involute curve, a cubic curve, a spiral curve, a quadratic curve, or other meshing geometric curves having the characteristics of satisfying the law gearing and the Euler-Savary equation. Each one of curves 62, 64, and 66 may be a combination of two or more of the above curves. Preferably, middle portion 64 is or includes a straight (that is, linear in transverse cross section) portion.

Thus, $S_1$ is defined as the height of the transition zone above the pitch line, at which point the transition curve terminates at the ATP 44. $S_2$ is defined as the height of the transition zone below the pitch line, at which point the transition curve terminates at the DTP 48. $Y_1$ and $Y_2$ are defined as coordinates reflecting the horizontal distance from the tooth centerline at the ATP and DTP, respectively. The term "pitch relief" is used herein as the difference between the absolute values of $Y_1$ and $Y_2$ times the transverse module $m_t$.

Figure 5:
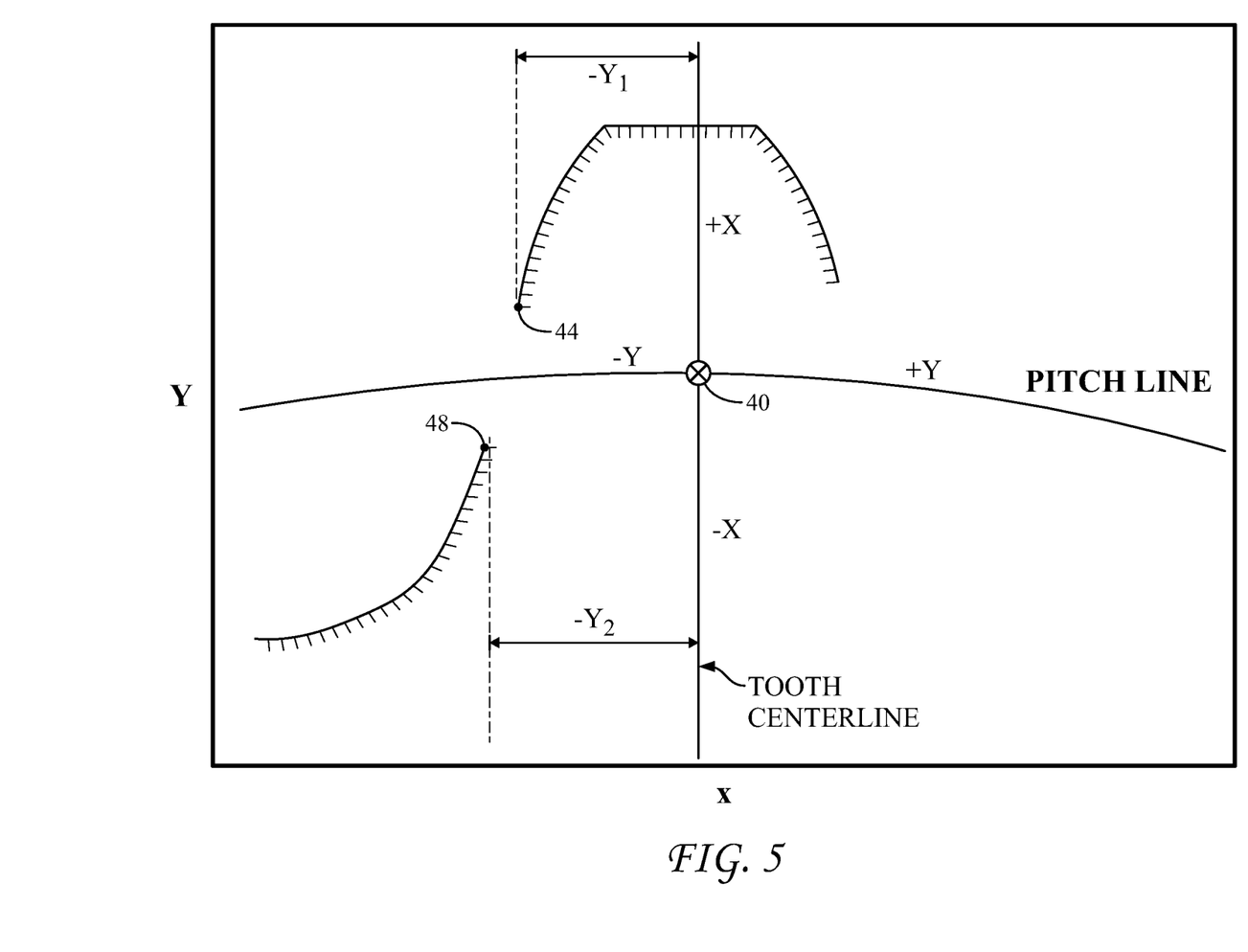
FIG. 5 is a cross sectional schematic gear tooth illustrating aspects of pitch relief.

Pitch relief provides a further flexibility in the construction of a viable transition zone by shifting the addendum or dedendum or both in the −Y direction to effectively satisfy that the transition zone extremities join the addendum and dedendum with tangency and at zero slope change. The dedendum and addendum of the mating gear respectively should have the same compensating values of −Y applied so that conjugacy is maintained. The changing of the values of −Y1 and −Y2 changes the value of the pitch relief as previously defined. See FIG. 5. Thus with the values of −Y1, −Y2, +s1, and −s2 able to be altered for a specific design, the transition zone configuration can be crafted for best performance results.

Transition zone heights $S_1$ and $S_2$ are expressed as a selected coefficient times the transverse module $m_t$ of the gear. The coefficient values $S_1$ and $S_2$ preferably are the same. The present invention is not limited to $S_1$ equal to $S_2$, and encompasses transition zones where $S_1$ is different from $S_2$. Thus the total transition height $S_T$ is the sum of $S_1$ and $S_2$ times the transverse module.

$$S_T = [S_1 + S_2] * m_t$$

For example, if $S_1=0.2$ and $S_2=0.3$ then $S_T=0.5$ $m_t$. As explained more fully below, the values of $S_1$, $S_2$, $Y_1$, and $Y_2$ preferably are selected such that the transition zone curve chosen meets both the ATP and DTP with tangency and at zero slope change.

For designing gear pairs to overcome the prior art problems and maintain contact across the entire tooth flanks of mating teeth, the following is a procedure for generating tooth profiles. The Euler-Savary equation gives a relation between the radii of curvature of two conjugate gear tooth profiles, depending on the position of the contact point on the path of contact. Since the curvatures are the reciprocals of the radii of curvature, this equation can be modified to give a relation between the curvatures. If a gear designer chooses a second relation between the curvatures, this relation can be expressed as a second equation, and the two equations can be solved to give the curvatures at conjugate points of the two profiles. The profiles can then be constructed in small increments, using the calculated curvature at each point. The relation chosen can be any function of the contact point position, but the simplest function, namely a constant relative curvature, has been found to work very well.

The value of the relative curvature when the contact is at the pitch point is given by the Euler-Savary equation, $$K_{relative} = (1.0/\sin \phi_t) * ((1.0/R_{P1}) + (1.0/R_{P2}))$$

where $\phi_t$ is the transverse pressure angle, and $R_{P1}$ and $R_{P2}$ are the pitch circle radii. A reference value (kappa) $K_{relative}$ was defined, as the value of $K_{relative}$ when the transverse pressure angle $\phi_t$ is 20.0 degrees. The value of the constant relative curvature was chosen as a fraction of the reference relative curvature, usually between 0.3 and 0.5. $K_{relative}$ is the relative curvature, which is defined as the sum of the first tooth curvature and the second tooth curvature at any contact point. From the equation above, a lower $\phi_t$ should result in increased $K_{relative}$, and in turn increased Hertz stress. But from trial and error it has been established that the increased relative curvature was more than compensated for by the reduced load intensity caused by the longer lines of contact as a result of full contact through the transition zone. The net result is an actual decrease in Hertz stress, as explained more fully herein. It is believed that this discovery has never been recognized for profiles defined by the 892 patent.

The limiting torque for any gear pair was found to depend primarily on the positions s, $\phi_t$ of the pinion and gear addendum profile starting points, where s is the distance from the pitch point along the line of contact, and $\phi_t$ is the gear pair pressure angle at this point. Values considered for s were between $0.01*m_t$ and $0.3* m_t$, where $m_t$ is the transverse module (that is, the normal module divided by the cosine of the helix angle). Values for $\phi_t$ were between 8.0 and 20.0, the lower value of 8.0 being chosen because grinding of the gears can be problematic when the transverse pressure angle is extremely small.

For one possible procedure, whatever position s, $\phi_t$ is chosen for the pinion addendum starting point on the path of contact, the gear addendum starting point lies on the opposite side of the pitch point, with a negative value of s and the same value of $\phi_t$. The path of contact between these two points is completed by a straight line, so that the pitch point lies at s=0.0. Since there is only one point between the initial addendum and dedendum profiles on the path of contact, there is no transition zone. It might be thought that three points in a straight line on the path of contact would create an involute segment of the pinion and gear transverse profiles. But three points are not enough to define an involute. They could be part of a circle or a cycloid, or any other convex curve. The choice of this point on the path of contact is consistent with points on the pinion and gear tooth profiles, lying at the pitch diameters and at the specified tooth thicknesses.

The relative curvature of the tooth profiles at the pitch point is given by the Euler-Savary equation above, and is very much higher than the reference value, which would normally result in a high contact stress. But this is compensated for by the fact that there is now contact through the transition zone. The total length of the lines of contact in the contact region are longer than those where there is a no-contact transition zone, so that the load intensity is lower. This procedure results in a well-designed helical gear pair, and can be adapted to include bevel, rack and pinion, and internal ring gear pairs, as well as spur gears.

Moreover, the invention through its further development is believed to have enhanced the load carrying capacity of gear pairs using the teachings of the '892 patent for the addendum and dedendum of mating gears, and unbroken tooth contact describe above, with the addition of a crafted involute curve—or other curve designed as described herein to meet the required kinematic and stress objectives, as understood by persons familiar with gear design technology—between the addendum and the dedendum, as explained more fully below.

A pair of conjugate profiles can be defined as taught in this patent application. In this regard, the conjugate profiles may be defined by either by the pinion tooth profile, the gear tooth profile, the basic cutter profile, or the shape of the contact path. When any one of these four shapes is known, it is possible to calculate the other three shapes. The methods by which these shapes are found have been described by Buckingham, Analytical Mechanics of Gears, McGraw-Hill, New York, 1949, republished by Dover, N.Y., 1963, as will be understood by persons familiar with conventional gear design and engineering. The most common method for defining a pair of profiles is to choose the shape of the basic cutter. For example, if the basic cutter profile is straight, involute gears are obtained. Less commonly, the shape of one tooth profile is chosen. For example, in Gerotor internal gear pumps, the lobes of the outer rotor are circular. Less commonly still, the shape of the contact path is chosen. For example, cycloidal gears can be defined as having profiles for which the contact path consists of two circular arcs.

Figure 3A:
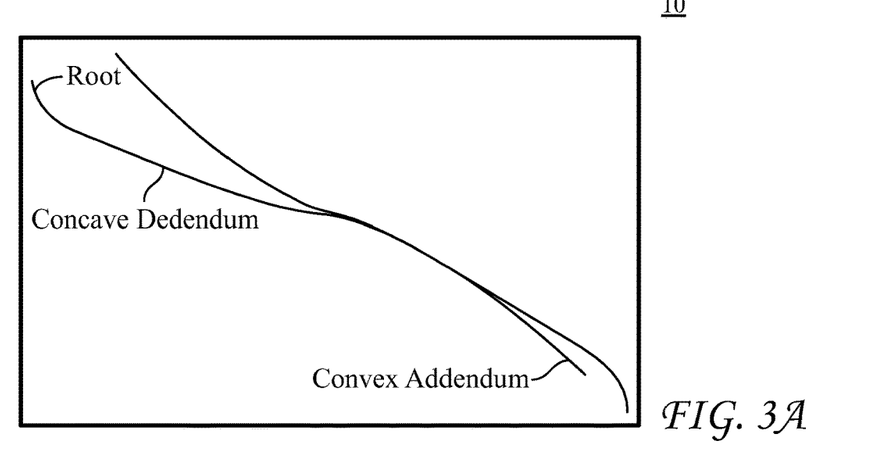
Figure 3B:
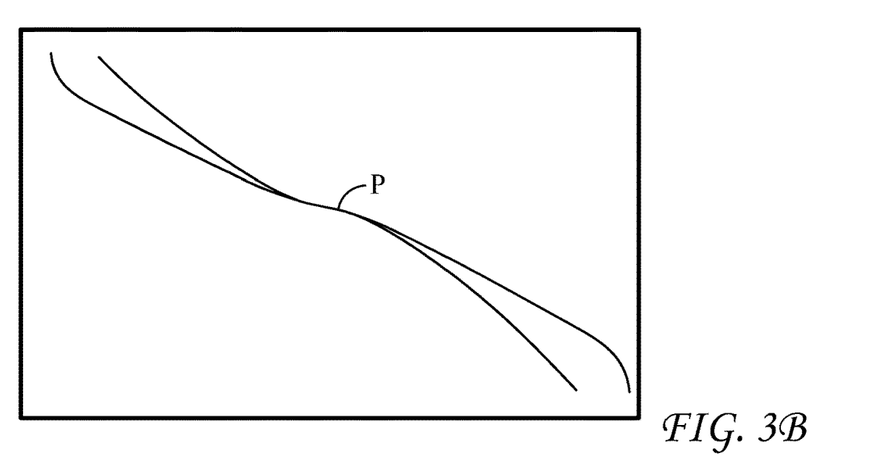
Figure 3C:
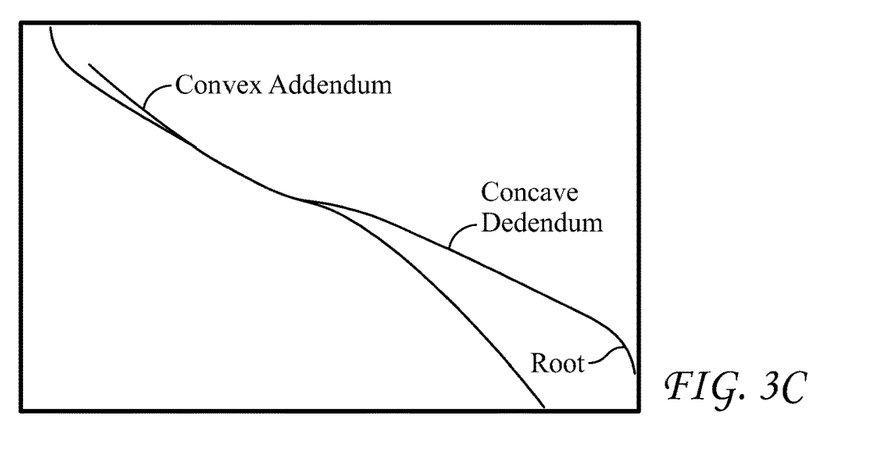

FIG. 3 illustrates a gear pair embodiment of the present invention. One of the gears has 18 teeth. The other gear has 33 teeth. The images illustrate the gear pair at a roll angle in FIG. 3A prior to the contact point being at the pitch point, a roll angle at FIG. 3B that corresponds to contact at the pitch point P, and a roll angle in FIG. 3C just after contact at the pitch point. The roots, concave dedendums, and convex addendums are identified in the figures.

Example gear pairs have been analyzed to compare the designs. The prior art involute gear pair (identified in the table as A) has 18 and 33 teeth, center distance of 170.0 mm, and helix angle of 28.8011 degrees, giving a face contact ratio of 1.05. As used herein, the face contact ratio is the contact ratio provided by the helix angle of the pair. Face contact ratios of the embodiments can vary widely but practice has generally center around integers plus a little overlap, such as, 2.05, 1.10, etc.

The 892 patent gear pairs (identified in the table as B) have the same tooth numbers, and the same center distance and helix angle as the involute gear pair. The material is grade 2 carburized steel, with allowable stresses of 1551.32 MPa for contact and 482.63 MPa for bending. The load distribution factor was chosen as 1.25, and the dynamic factor as 1.1, so the calculated contact stresses are multiplied by 1.172604 and the bending stresses by 1.375, before being compared with the allowable stresses. The limiting torque is reached when one or other of the modified stresses is equal to the allowable value.

The prior art involute gear pair (A), with a normal pressure angle of 20.0 degrees, was found to have a limiting torque of 2350.12 Nm. The prior art 892 gear pair (B) with the same tooth numbers, and the same overall dimensions as the involute gear pair, and a transition zone designed according to the 892 patent, has a limiting torque of 2623.65 Nm, an increase of 12%.

For a gear pair (identified in the table as C) designed according to the present invention (that is, using the methods described herein) having 18 and 33 teeth, the optimum gear pair was found with an s value of $0.15* m_t$, a transverse pressure angle of 8.0 degrees, and a limiting torque of 3093.27 Nm, an increase over the gear pair designed according to the 892 method, of 18%.

According to a preferred embodiment, the invention is believed to have enhanced the load carrying capacity of gear pairs using the teachings of the '892 patent for the addendum and dedendum of mating gears, and unbroken tooth contact describe above, with the addition of an involute curve (being tangent to the addendum and dedendum and preferably at zero slope) change between the addendum and the dedendum (identified in the table as D).

The involute portion of the new tooth form preferably is tangent to the addendum and dedendum transition points and preferably occurs at zero slope change. The above disclosure describes the height of the transition zone in modules and initially its height was near zero (that is, $0.01 m_t$ to $0.03 m_t$ or in another instance 0.0), and in the 892 Patent a pressure angle at the pitch line of 1° to 3°. It is understood in the gear field that pressure angles that low are not conductive to efficient manufacture and pressure angles above approximately 8° are more desirable. Recent investigations at the 8° figure and running up to 23° in addition to increasing the transition zone height from near zero as describe above to as high as 1.0 modules (creating a nearly entire involute shape) revealed the following performance data based on calculations of "allowable torque". "Allowable torque" is defined as that input torque to the gear pair that first reaches an allowable Hertz (contact) stress or an allowable bending stress.

All the derating factors in these calculations have been held equal for all pairs being considered to have a credible comparison of allowable torques. Pressure angles that were varied from 8° to 23° with near zero transition zone height resulted in variations in allowable torques that reached a maximum—but beyond 23° the allowable torque decreased. It is surmised that pressure angles greater than 23° might be feasible in some configurations, and thus the practical limit depends on the particular gear parameters chosen for the particular application Next the effects of transition zone height were investigated, starting at a value of 0.02 modules, that is, essentially or nearly a zero height transition zone, increasing to 0.20 modules, 0.40 modules and up to 1.0 modules where the last value caused the majority of the tooth height to be that nearly equal to an involute. Then a value of 20° was selected for the pressure angle and the transition zone height varied to find where the maximum allowable torques occurred. This height will vary with the specific design parameters being considered. Transition zone height was varied from 0.05 modules to 0.50 modules and pressure angle was again varied around the 20° value to find maximum allowable torque. Pressure angle selection will be a function of design and manufacturing choices. Preliminary values of allowable torque are summarized here.

Pair Definition:

| | |
|---|---|
| Number of pinion teeth | 18 |
| Number of gear teeth | 33 |
| Center distance | 170 mm |
| Face width | 40 mm |
| Material/heat treatment | Carburized steel |
| Derating factors | Same for all cases |

| Gearing Evaluated | | Allowable Torque Number |
|---|---|---|
| A. | Optimized involute (prior art) | 2340 Nm |
| B. | Pair per '892 patent (prior art) | 2650 Nm |
| C. | Inventive Pair | 3093 Nm |
| D. | Inventive Pair (involute curve) | 3250 Nm |

Incorporating an involute curve in the transition zone, according to gear pair D, has some drawbacks. One disadvantage is that the transition zone area incorporating an involute curve by both members of the gear pair will display higher Hertz stress numbers (involute curves mesh with convex/convex characteristics) than those calculated for the addendum and the dedendum of the prior '892 design thus mitigating the lower stress characteristics of the '892 active tooth surfaces.

There are advantages to a continuous line of contact with conjugacy throughout the meshing cycle as opposed to the break in the lines of contact with the '892 design. With this break (as in the prior art configuration), in addition to being viewed with skepticism by engineers skilled in the gear art, a great deal of care and design skill is necessary to properly blend the transition zone with the addendum and the dedendum of the '892 design. Without such skill in design, maladies of gear mesh characteristics are possible in the prior art design.

Embodiments of the invention may include significant lengthening of the lines of contact for the involute transition zone design, which create significant increases in allowable torques over both the '892 design and the nearly zero transition zone, described above, with acceptable transmission error parameters over reasonable gear pair center distance ranges. It is also surmised that changes in center distance and the effects of gear member pitch diameter eccentricities will be easily accommodated while maintaining full contact of the flanks of both gear pair members. Defined accuracy of the gear and pinion, that is, their allowable eccentricities along with the changes in gear pair center distance by virtue of manufacturing tolerances of the gear mounting features (for example, the housing), can both become inputs to the transition zone height value selected by the gear design engineer, as will be understood by persons familiar with gear tooth profile engineering.

Comprehensive examination of the meshing characteristics of gear pairs designed and built to the teachings of the 892 patent showed that profile contact ratios were typically less than 1.0. This fact was due to the existence of a no-contact transition zone between the addendum and dedendum portions of the tooth form straddling the pitch line and through which no mating tooth contact takes place. In the prior art gearing, this typical profile contact ratio of less than 1.0 precluded the possibility of spur gearing, that is, gear pairs with helix angles of 0.0° for prior art pairs. In this regard, the Euler Savary equation for conjugacy is not maintained in the area of the transition zone in which case insufficient relative angular motion would take place. As used herein, the profile contact ratio, also known as the transverse contact ratio, depends on the tooth profiles of the meshing gears in transverse cross section and is the contact ratio of the respective member tooth flanks in contact. The profile contact ratio is more specifically defined as the length of the contact path divided by the transverse base pitch, as explained in *The Geometry of Involute Gears*, by J. R. Colbourne, page 384, which definition is incorporated herein by reference. For spur gears, the profile contact ratio preferably is greater than 1.0, more preferably 1.2 to 1.5 and higher if feasible according to the particular design parameters.

The creation of a load carrying transition zone according to the new teachings maintains constant relative angular motion between a pair of gears designed according to the new teaching. In addition, there is created a continuous line of contact throughout the tooth meshing cycle. If the profile contact ratio of a gear pair according to the present disclosure is calculated as per equation number one, it is found that the value of this important gear parameter is approximately 1.2 to 1.5. Such values meaningfully greater than 1.0, make spur gear pairs not only possible but due to the primarily conformal meshing characteristics under the new teachings will exhibit contact stress levels lower than those of an equivalent involute pair, that is, same ratio, center distance, face width, materials, and heat treatments.

The present invention has been described with reference to specific embodiments. The present invention is not limited to the specific embodiments disclosed herein, but rather encompasses the full scope of the claims.

What is claimed:

1. A gear system comprising:
   a first gear including a tooth flank profile that includes a convex addendum and a concave dedendum; and
   a mating gear including a tooth flank profile that includes a convex addendum and a concave dedendum,
   the first gear and the mating gear when in mesh satisfy the Euler-Savary equation for conjugacy with contact over the entire tooth flank such that lines of contact are unbroken.

2. The gearing system of claim 1 wherein the first gear has a transition zone between the addendum and dedendum of the first gear, and wherein the mating gear has a transition zone between the addendum of and dedendum of the mating gear, the transition zone of each one of the first gear and the mating gear is adapted for contacting the transition zone of the other one of the transition zones of the first gear and the mating gear.

3. The gearing system of claim 2 wherein the first gear and mating gear define a pitch point, a contact path, and a pitch line, and the pitch point of the contact path and two points of the contact path immediately above and below the pitch line form a straight line.

4. The gearing system of claim 2 wherein the first gear and mating gear define a pitch point and a gear pair pressure angle, and the gear pair pressure angle at the pitch point is between 3.0 and 30.0 degrees.

5. The gearing system of claim 4 wherein the gear pair pressure angle at the pitch point is between 8.0 and 20.0 degrees.

6. The gearing system of claim 2 wherein calculated Hertz stress values of the first gear and mating gear are less than calculated Hertz stress values in an equivalent involute gearing system having involute tooth profiles and having the same gear ratio, number of teeth, face width, materials and heat treatment, and center distance.

7. The gearing system of claim 2 wherein calculated Hertz stress values of the first gear and mating gear are less than calculated Hertz stress values in an equivalent gearing system with tooth profiles configured according to the 892 patent and having the same gear ratio, number of teeth, face width, materials and heat treatment, and center distance.

8. The gearing system of claim 2 wherein the transition zone of each one of the first gear and the mating gear defines a curve that is tangent to the addendum at an addendum transition point at zero slope change and tangent to the dedendum at a dedendum transition point at zero slope change.

9. The gearing system of claim 2 wherein the transition zone of the first gear comprises an involute curve.

10. The gearing system of claim 9 wherein the mating gear transition zone comprises an involute curve.

11. The gearing system of claim 10 wherein each one of the involute curves is tangent to the addendum at an addendum transition point and tangent to the dedendum at a dedendum transition point at zero slope change.

12. The gearing system of claim 2 wherein the transition zone has a height varying between 0.01 transverse modules and 0.80 transverse modules.

13. The gearing system of claim 2 wherein the transition zone has a height varying between 0.1 to 0.3 transverse modules.

14. The gearing system of claim 11 wherein each one of the involute curves has a pressure angle at a pitch diameter of from 1° to 30°.

15. The gearing system of claim 11 wherein each one of the involute curves has a pressure angle at a pitch diameter of from 8° to 23°.

16. The gearing system of claim 2 wherein the transition zone located between the addendum and dedendum of the first gear is a meshing curve that includes at least one of cubic curves, spiral curves, quadratic curves, and a straight line.

17. The gearing system of claim 16 wherein the first gear defines an addendum transition point and a dedendum transition point, and the meshing curve is tangent to the addendum at the addendum transition point at zero slope change and tangent to the dedendum at the dedendum transition point at zero slope change.

18. The gearing system of claim 17 wherein the meshing curve is a straight line.

19. The gearing system of claim 2 wherein the first gear and mating gear are helical gears.

20. The gearing system of claim 2 wherein the first gear and mating gear are spur gears.

\* \* \* \* \*